United States Patent
Perrone

(10) Patent No.: US 10,325,520 B2
(45) Date of Patent: Jun. 18, 2019

(54) SIMULATED FORCIBLE ENTRY OF PADLOCKS

(71) Applicant: Michael Perrone, Seaford, NY (US)

(72) Inventor: Michael Perrone, Seaford, NY (US)

( * ) Notice: Subject to any disclaimer, the term of this patent is extended or adjusted under 35 U.S.C. 154(b) by 524 days.

(21) Appl. No.: 15/048,147

(22) Filed: Feb. 19, 2016

(65) Prior Publication Data

US 2017/0004733 A1 Jan. 5, 2017

Related U.S. Application Data

(60) Provisional application No. 62/119,227, filed on Feb. 22, 2015.

(51) Int. Cl.
*G09B 19/00* (2006.01)
*G09B 19/24* (2006.01)
*A62B 3/00* (2006.01)

(52) U.S. Cl.
CPC .............. *G09B 19/24* (2013.01); *A62B 3/005* (2013.01)

(58) Field of Classification Search
USPC .......... 434/219, 226, 247, 258; 49/381, 394, 49/504; 292/163, 219, 240, 241, 261
See application file for complete search history.

(56) References Cited

U.S. PATENT DOCUMENTS

| | | | | |
|---|---|---|---|---|
| 3,497,992 A | * | 3/1970 | Balter | A63H 33/00 446/76 |
| 4,457,722 A | * | 7/1984 | Housand | A63F 9/00 434/260 |
| 5,906,493 A | * | 5/1999 | Bishop | G09B 9/00 292/357 |
| 7,972,139 B2 | * | 7/2011 | Staub | G09B 19/24 434/226 |
| 8,197,257 B2 | * | 6/2012 | Clewis | A62B 5/00 434/226 |
| 8,485,825 B2 | * | 7/2013 | Walker | G09B 19/00 434/226 |
| 9,550,082 B2 | * | 1/2017 | Britton | A62C 99/0081 |

* cited by examiner

*Primary Examiner* — Kurt Fernstrom

(57) ABSTRACT

Simulated padlock devices and associated training devices are provided, which allow simulated forcible entry of padlocks using cutting or lock breaking devices. For example, a simulated padlock includes first and second metallic plates, a u-shaped metallic rod, and connecting elements (such as threaded bolts) to connect the first and second metallic plates together with end portions of the u-shaped metallic rod secured between the first and second plates by compressive forces applied from connecting the first and second metallic plates together using the connecting elements. The u-shaped metallic rod is configured to simulate a shackle of the simulated padlock device. The first and second metallic plates, which are connected together with the end portions of the u-shaped metallic rod secured there between, are configured to simulate a lock body of the simulated padlock device with the simulated padlock device in a simulated locked state.

20 Claims, 12 Drawing Sheets

SIMULATED FORCIBLE ENTRY OF PADLOCKS

CROSS-REFERENCE TO RELATED APPLICATION

This application claims priority to U.S. Provisional Patent Application Ser. No. 62/119,227 filed on Feb. 22, 2015, the disclosure of which is incorporated herein by reference.

TECHNICAL FIELD

The present disclosure relates generally to devices and methods for the training of forcible entry of locked doors, and in particular, devices and methods for simulated forcible entry of padlocks.

BACKGROUND

In emergency situations, police, firefighters, and other first responders may need to forcibly enter a building or dwelling to gain access in order to save lives. One common method of forcible entry involves forcibly opening a locked door. To master the skill of forcible entry of locked doors, one should have a basic knowledge of various types and doors and security devices that can be encountered in emergency situations, as well as actual training in the forcible entry of locked doors using various types of tools that are utilized for such purpose. One forcible entry technique that is commonly performed in emergency situations is forcible entry of padlocks. A padlock is a type of lock that includes a u-shaped shackle and lock body. The shackle slidably and pivotally moves in relation to the lock body when the padlock is in an "unlocked" state, and the shackle is secured in place by the lock body when the padlock is in a "locked" state.

In general, there are several techniques that are commonly used for removing padlocks in emergency situations. One technique involves the use of a gas-powered circular saw that is equipped with a special circular blade (e.g., aluminum oxide or diamond blade) which is capable of cutting through a portion of a padlock (e.g., cutting the shackle). Another technique for forcible entry of padlocks involves the use of a lock-breaking device to break the shackle from the lock body of the padlock.

For example, FIG. 1A schematically illustrates a conventional lock breaking device (10) which is commonly referred to as a "duck bill" lock breaker. The lock breaking device (10) comprises a rubberized handle (12) and a tapered head (14) (or "duck bill"). The tapered head (14) comprises a wedge portion (16) which comes to a point (18). Another conventional tool that can be used for breaking a padlock is a prying tool referred to as "Halligan" tool. A Halligan tool is a special tool commonly used by firefighters for prying, twisting, punching, or striking For example, FIG. 1B schematically illustrates a conventional "Halligan" tool (11) that is commonly used by firefighters for forcible door entry. The tool (11) includes a claw (or fork) (13), a blade (wedge) (15) (what is commonly referred to as an ADZ end), and a tapered pick (17), which is especially useful in quickly forcing open many types of locked doors.

FIG. 2 schematically illustrates a method for forcibly breaking a padlock (20) using the lock breaking device (10) of FIG. 1A. As shown in FIG. 2, the lock breaking device (10) is manipulated to insert the point (18) of the duckbill head (14) between a lock body (22) and a shackle (24) of the padlock (20). Once the duck bill head (14) is inserted into position, the back of the duckbill head (14) is struck with a head (26) of a flat head axe or a sledge hammer or maul, for example. As the duckbill head (14) is continually struck, the wedge portion (16) of the head (14) is driven further down between the lock body (22) and the shackle (24), which results in incrementally increasing a wedge force between the lock body (22) and the shackle (24). The increasing wedge force ultimately results in separating the shackle (24) from the lock body (22).

Similarly, the Halligan tool (11) of FIG. 1B can be used to break a padlock. For example, to break the padlock (20) shown in FIG. 2 using the Halligan tool (11), the tapered pick (17) can be inserted between a lock body (22) and a shackle (24) of the padlock (20). Once the tapered pick (17) is inserted into position, the top surface of the ADZ end (15) can be repeatedly struck with the head of a flat head axe or a sledge hammer or maul, for example, to break the shackle (24) from the lock body (22). For other forcible entry techniques, the ADZ end (15) or fork end (13) of the Halligan tool (11) can be used to break through the latch of a swinging door by forcing the ADZ end (15) or fork end (13) of the tool (11) between the door and doorjamb and prying the door and doorjamb apart using known techniques.

SUMMARY OF THE INVENTION

Embodiments of the invention generally include simulated padlock devices and associated training devices, which are configured to allow individuals to simulate forcible entry of padlocks using cutting or lock breaking devices.

For example, one embodiment includes a simulated padlock device. The simulated padlock device includes a first metallic plate, a second metallic plate, and a u-shaped metallic rod. The device further includes connecting elements (such as threaded bolts) to connect the first and second metallic plates together with end portions of the u-shaped metallic rod secured between the first and second plates by compressive forces applied from connecting the first and second metallic plates to each other using the connecting elements. The u-shaped metallic rod is configured to simulate a shackle of the simulated padlock device. The first and second metallic plates, which are connected together with the end portions of the u-shaped metallic rod secured there between, are configured to simulate a lock body of the simulated padlock device with the simulated padlock device in a simulated locked state.

Another embodiment includes a device for simulated forcible entry of padlock devices. The device includes a metallic base plate, a holding ring connected to the metallic base plate, and a simulated padlock device which is removably connected to the holding ring. The simulated padlock device includes a first metallic plate, a second metallic plate, and a u-shaped metallic rod inserted through the holding ring. The simulated padlock device further includes threaded bolts connecting the first and second metallic plates together with end portions of the u-shaped metallic rod secured between the first and second plates by compressive forces applied from bolting the first and second metallic plates together using the threaded bolts. The u-shaped metallic rod is configured to simulate a shackle of the simulated padlock device. The first and second metallic plates, which are bolted together with the end portions of the u-shaped metallic rod secured there between, are configured to simulate a lock body of the simulated padlock device with the simulated padlock device in a simulated locked state. The threaded bolts extend past a face of the first metallic base plate to maintain the lock body of the simulated padlock device offset from a face of the metallic base plate.

These and other embodiments will become described in the following detailed description of embodiments, which is to be read in conjunction with the accompanying figures.

DETAILED DESCRIPTION OF EMBODIMENTS

Embodiments of the invention will now be described in further detail with regard to devices and methods for simulated forcible entry of padlocks. It is to be understood that the various features, elements, and structures shown in the accompanying drawings are schematic illustrations that are not drawn to scale. It is to be further understood that same or similar reference numbers are used throughout the drawings to denote the same or similar features, elements, or structures, and thus, a detailed explanation of the same or similar features, elements, or structures will not be repeated for each of the drawings. It is to be understood that the terms "about" or "substantially" as used herein with regard to thicknesses, widths, diameters, etc., are meant to denote being close or approximate to, but not exactly. For example, the term "about" or "substantially" as used herein implies that a small margin of error is present, such as 10% or less than the stated amount.

Figure 3A:
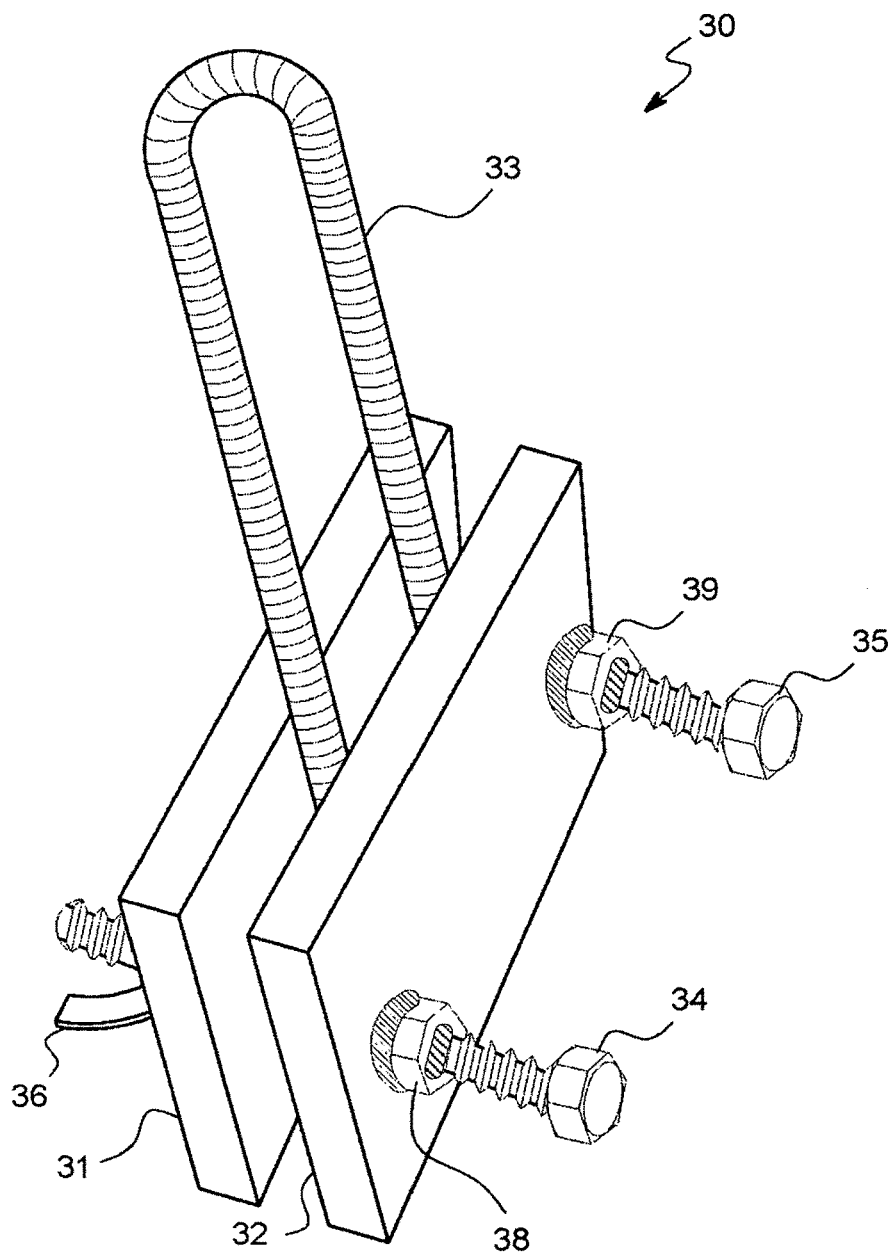
FIG. 3A is a perspective view of a simulated padlock device according to an embodiment of the invention.
Figure 3B:
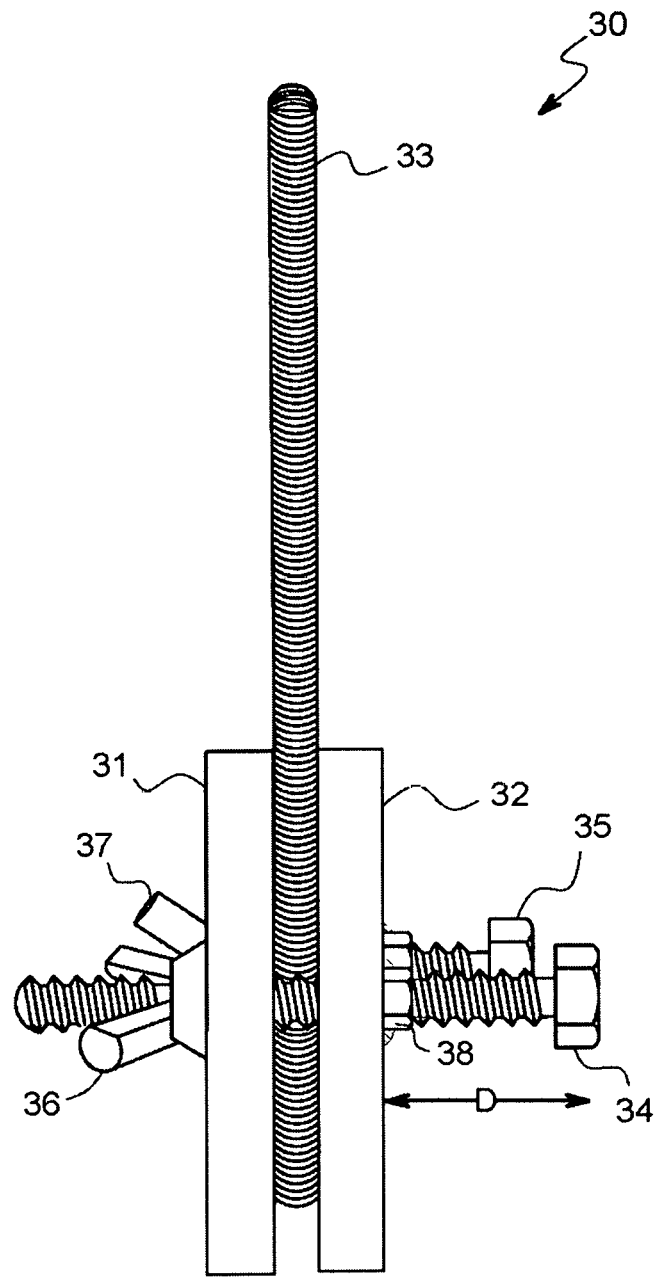
FIG. 3B is side view of the simulated padlock device of FIG. 3A.

FIGS. 3A and 3B illustrate a simulated padlock device (30) according to an embodiment of the invention, which is configured to allow individuals to simulate forcible entry of padlocks using cutting or lock breaking devices. The simulated padlock device (30) comprises a first steel plate (31), a second steel plate (32), a u-shaped steel rod (33), connecting bolts (34) and (35), and wing nuts (36) and (37). The steel plates (31) and (32) are configured to simulate a padlock body, and the u-shaped steel rod (33) is configured to simulate a padlock shackle.

To simulate a padlock in a "locked" state, the end portions of the u-shaped steel rod (33) (simulated padlock shackle) are placed between the steel plates (31) and (32), and the wing nuts (36) and (37) are tightened to apply a sufficient compressive force to securely maintain the end portions of u-shaped steel rod (33) between the steel plates (31) and (32). The connecting bolts (34) and (35) pass through apertures that are formed in alignment in the steel plates (31) and (32). In one embodiment of the invention, the connecting bolts (34) and (35) are fixedly secured to one of the steel plates (e.g., the second steel plate (32) as shown in FIGS. 3A and 3B) using respective nuts (38) and (39) which are welded to the shafts of the bolts (34) and (35) and to the surface of the steel plate (32). The other steel plate (e.g., the first steel plate (31)) slidably engages the shafts of the bolts (34) and (35) to enable insertion of the ends of the u-shaped steel rod (33) between the first and second steel plates (31) and (32), when the wing nuts (36) and (37) are loosened. As shown in FIG. 3B, the heads of the bolts (34) and (35) are fixedly disposed at a distance D from the face of the steel plate (32). In another embodiment, both steel plates (31) and (32) can slidably engage the shafts of the bolts (34) and (35) in which case the respective nuts (38) and (39) are not welded to the steel plate (32), but rather serve as stop elements that are free to spin on the shafts the bolts (34) and (35) to adjust the distance D.

In one embodiment of the invention, the steel plates (31) and (32) comprise rectangular-shaped pieces of steel having a thickness in a range of ¼ inch to ½ inch, for example. The u-shaped steel rod (33) can be formed from a length of threaded or non-threaded steel rod with a diameter in a range of about ¼ inch to ½ inch, for example. The use of threaded steel rods provides an increased frictional force to maintain the ends of the u-shaped steep rod (33) between the steel plates (31) and (32) when the wing nuts (36) and (37) are tightened to compress the ends of the u-shaped steep rod (33) between the steel plates (31) and (32).

Overall, the simulated padlock device (30) can be used to simulate forcible entry of padlocks. For example, a circular saw can be used to cut the u-shaped steel rod (33) to simulate the cutting of a padlock shackle. Moreover, a lock breaking device such as the duckbill device (10) of FIG. 1A or the Halligan tool (11) of FIG. 1B can be used to simulate the breaking of a padlock shackle from the padlock body using the techniques as discussed above with reference to FIG. 2.

Figure 1A:
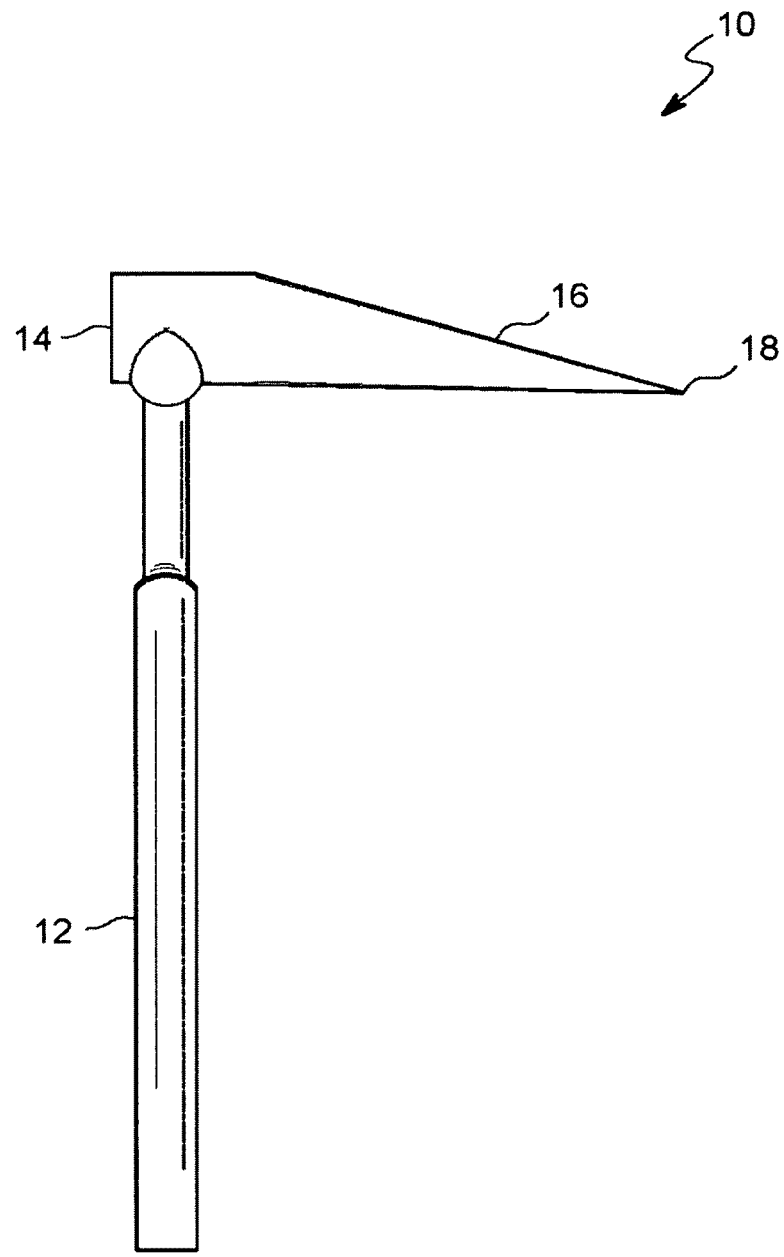
FIG. 1A schematically illustrates a conventional lock breaking device.
Figure 1B:
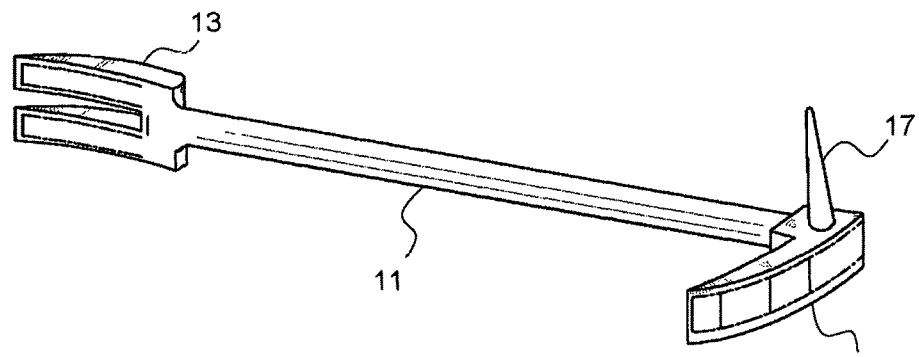
FIG. 1B illustrates a conventional Halligan forcible entry tool.
Figure 2:
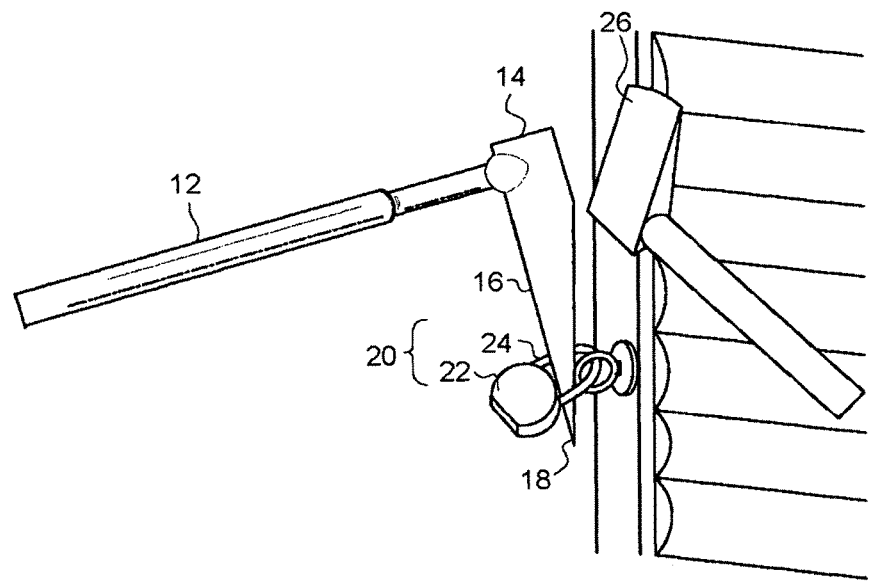
FIG. 2 schematically illustrates a method to forcibly break a padlock using the conventional lock breaking device of claim 1.

In particular, using the simulated padlock device (30), the lock breaking device (10) of FIG. 1A is manipulated to insert the point (18) of the duckbill head (14) between the u-shaped steel rod (33) (simulated shackle) and the steel plates (31)/(32) (simulated padlock body). Once the duck bill head (14) is inserted into position, the back of the duckbill head (14) is struck with the head of a flat head axe or a sledge hammer or maul, for example. As the duckbill head (14) is continually struck, the wedge portion (16) of the head (14) is driven further down, incrementally forcing the ends of the u-shaped steel rod (33) to be pulled out from between the steel plates (31)432) with each blow to the duck bill head (14). Eventually, the ends of the u-shaped steel rod (33) can be completely pulled out from between the steel plates (31)/(32), simulating the breaking of a padlock shackle from the padlock body. The compressive/frictional forces that exist between the ends of the u-shaped steel rod (33) and the inner surfaces of the steel plates (31)/(32) (when the wing nuts (36) and (37) are tightened) serves to simulate the resistive mechanical forces that would be required to break a padlock shackle from a padlock body of a conventional padlock.

With the example simulated padlock design of FIGS. 3A/3B, the steel plates (31)/(32) and securing bolts/nuts (34, 35, 36, 37) are reusable components that are not destroyed during training by repeated simulated forcing of the padlock device (30). Moreover, the u-shaped steel rod (33) is a reusable component that can be repeatedly used for simulating the cutting and breaking of a padlock shackle in the simulated padlock device (30). For example, a u-shaped steel rod (33) having a relatively long length can be used multiple times for simulated cutting of a padlock shackle, until the u-shaped steel rod (33) becomes too short for reuse in simulated cutting techniques. In such case, a new u-shaped steel rod (33) can be readily created using techniques as discussed below.

It is to be noted that the simulated padlock device (30) can be utilized to simulate the breaking of a padlock shackle using the duckbill lock breaker device (10) of FIG. 1A when the u-shaped steel rod (33) is not too long. Indeed, the wedge action of the duckbill lock breaker device (10) of FIG. 1A would not be effective for simulated breaking of the simulated padlock device (30) if the distance between the top edge of the steel plates (31)/(32) and the top curved portion of the u-shaped steel rod (33) is greater than the largest width of the wedge portion (16) of the tapered head (14). In this instance, irrespective of the distance between the top edge of the steel plates (31)/(32) and the top curved portion of the u-shaped steel rod (33), the Halligan tool (11) of FIG. 1B can be used in conjunction with the simulated padlock device (30) to simulate the breaking of a padlock shackle. With this technique, an individual would insert the pike end (17) of the Halligan tool (11) through the u-shaped steel rod (33) with the pike end (17) placed against the top edges of the steel plates (31)/(32), and repeatedly strike the top surface of the ADZ (15) (with an axe head or maul) to incrementally force the ends of the u-shaped steel rod (33) to be pulled out from between the steel plates (31)/(32) with each blow to the ADZ end (17).

Figure 4A:
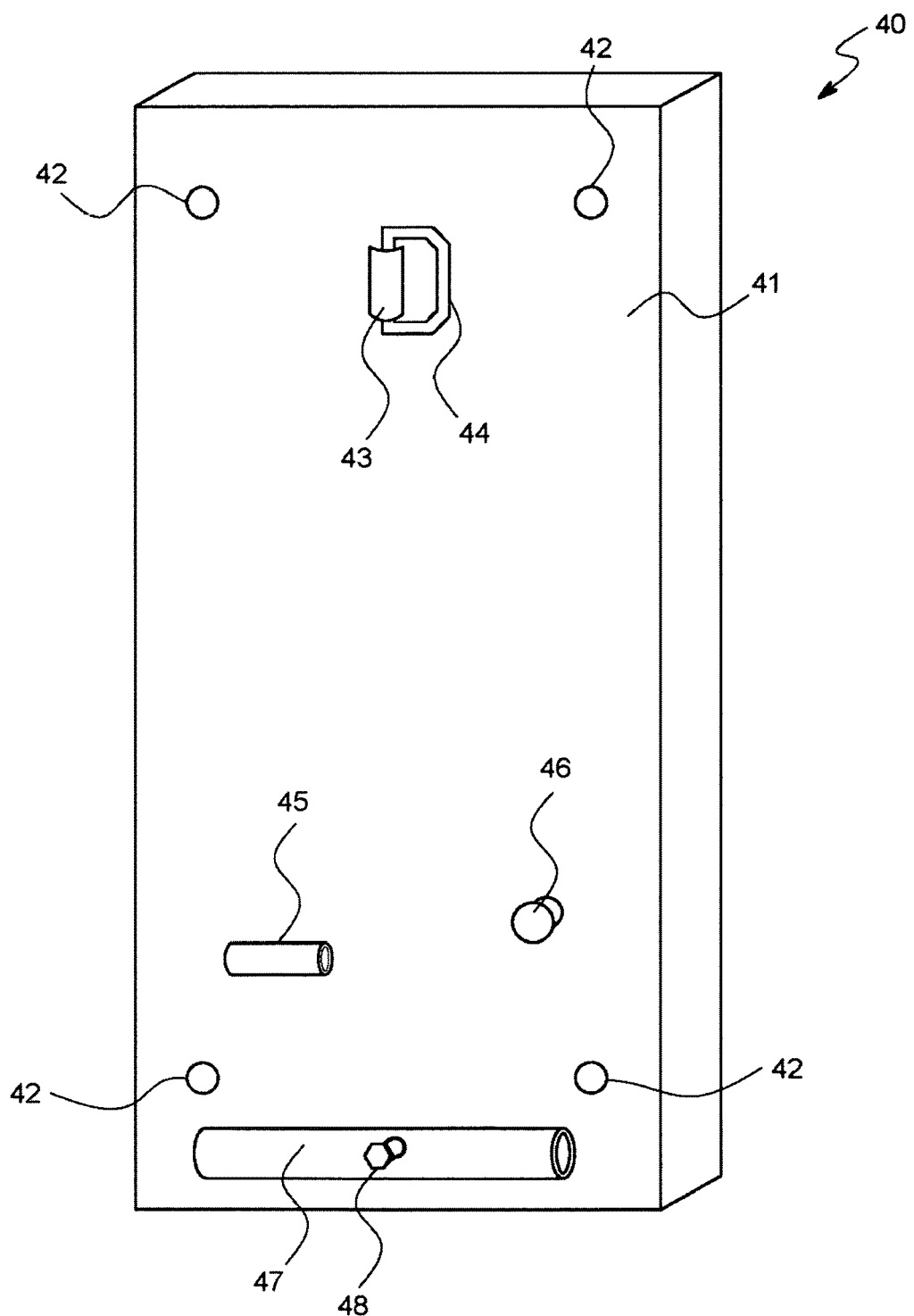
FIG. 4A schematically illustrates a training device that is configured for use in the training of forcible entry of padlocks, according to an embodiment of the invention.
Figure 4B:
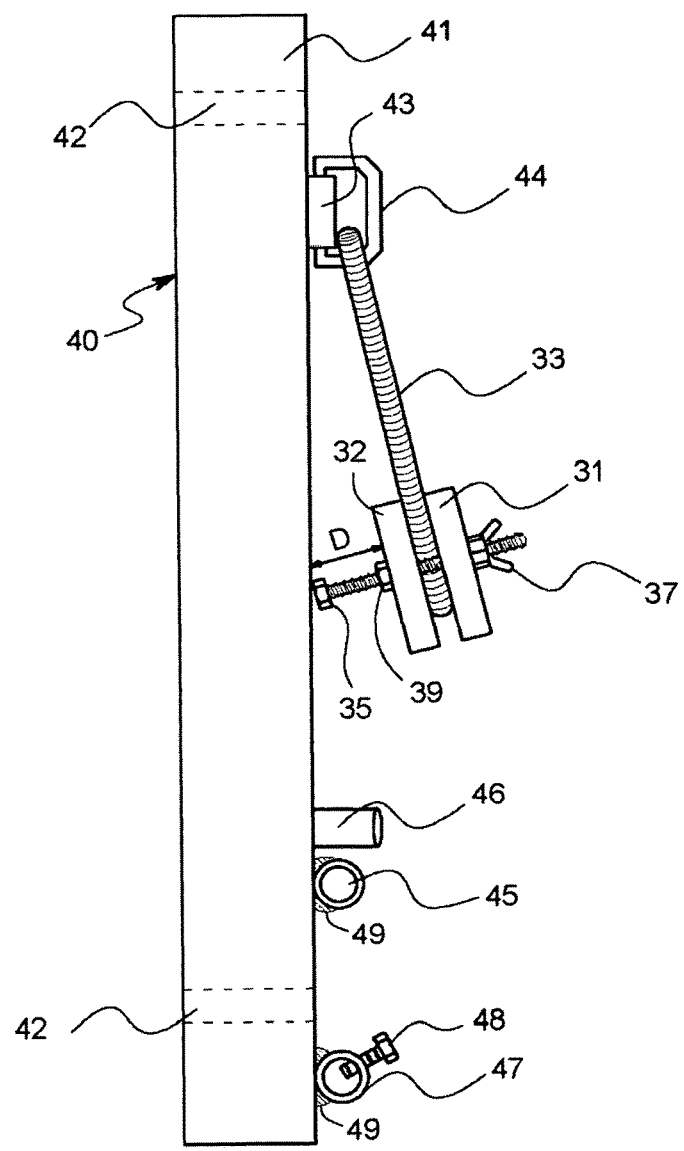
FIG. 4B schematically illustrates a method of using the simulated padlock device of FIG. 3A/3B with the training device of FIG. 4A, according to an embodiment of the invention.
Figure 4C:
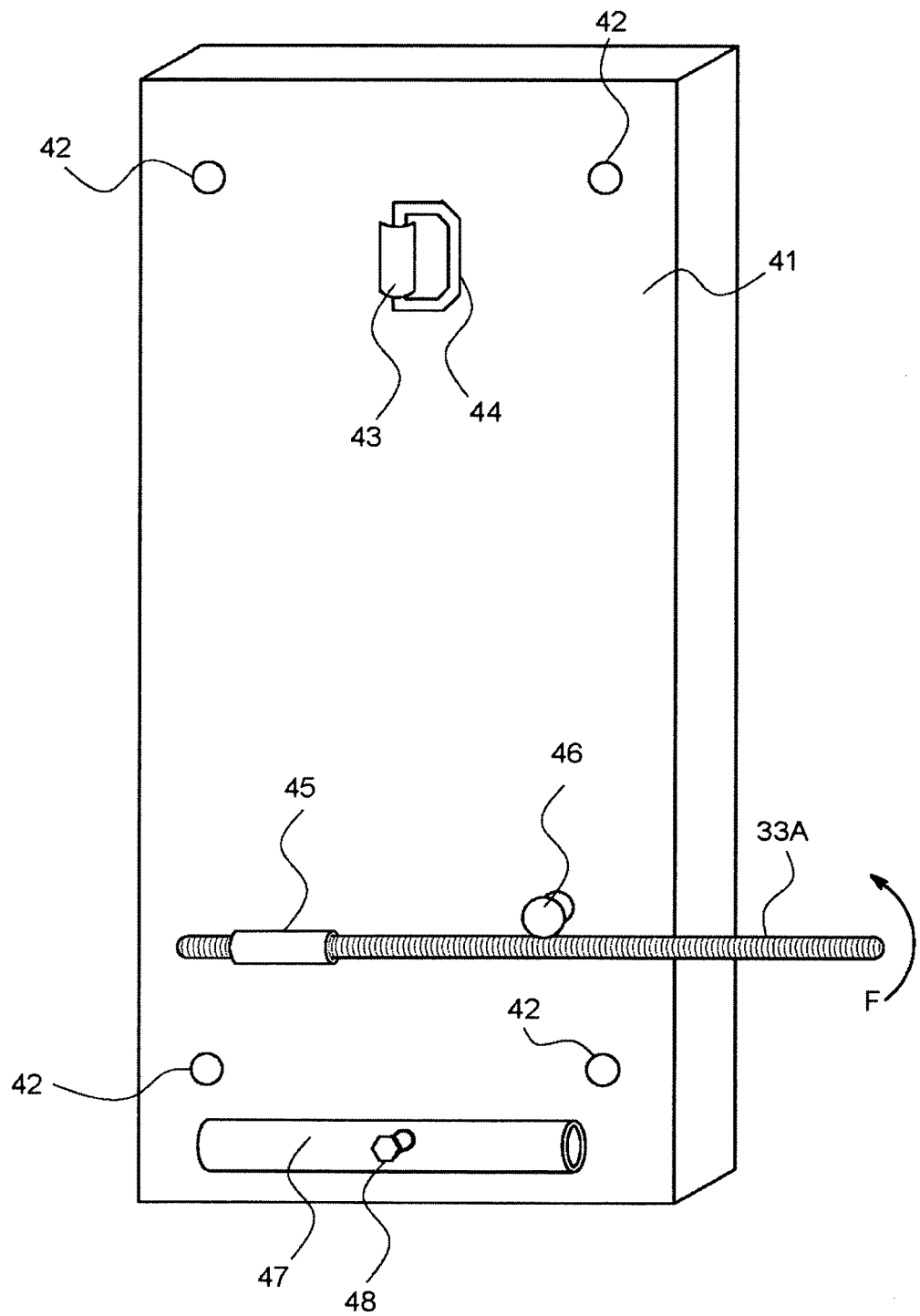
FIGS. 4C and 4D schematically illustrate a method of forming a shackle element of a simulated padlock device using the training device of FIG. 4A, according to an embodiment of the invention.
Figure 4D:
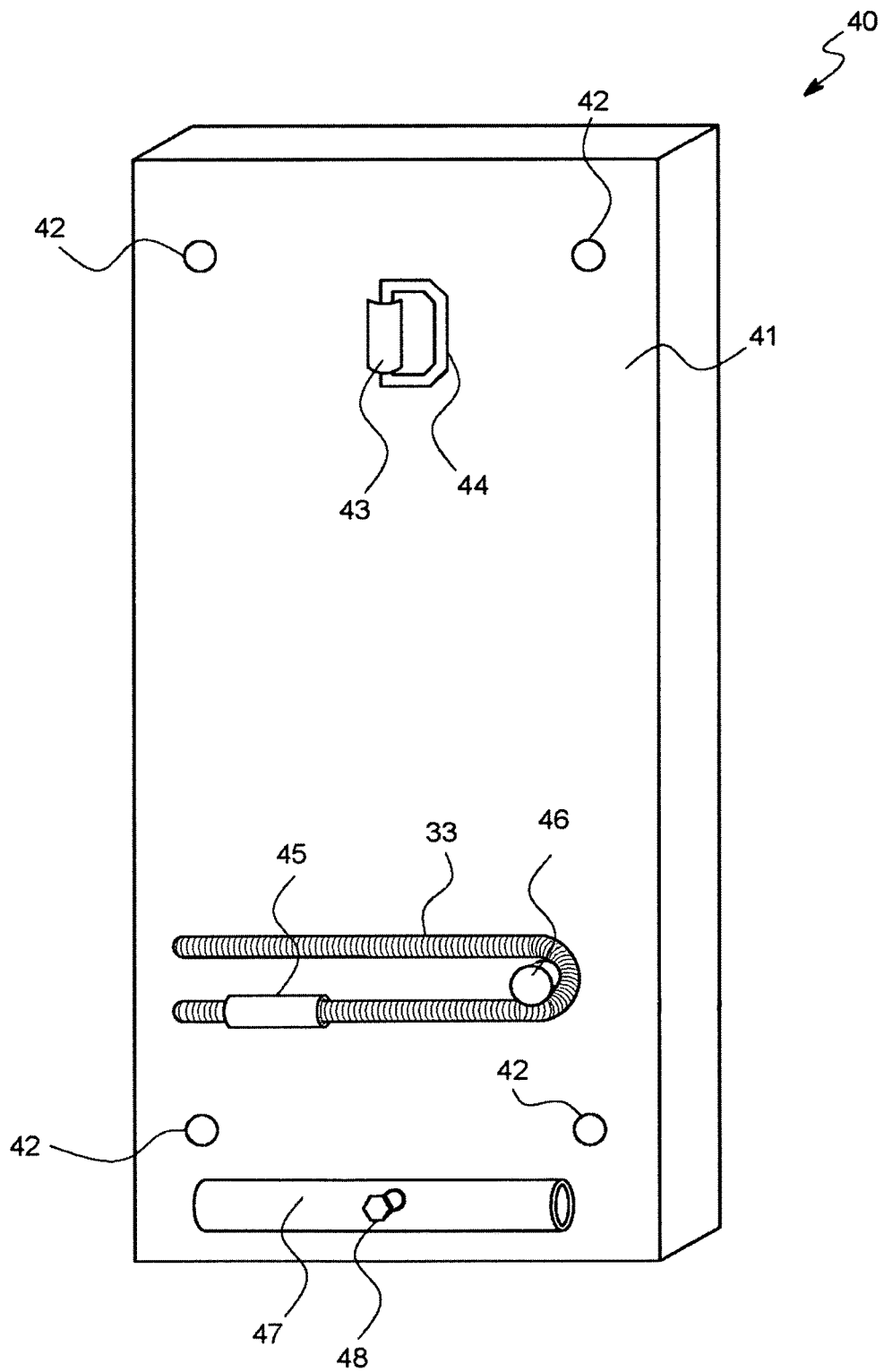

FIGS. 4A, 4B, 4C, and 4D schematically illustrate a training device (or training plate) that is configured for use in the training of forcible entry of padlocks, according to an embodiment of the invention. In particular, FIG. 4A schematically illustrates a training device (40) that is configured for use in the training of forcible entry of padlocks, according to an embodiment of the invention. FIG. 4B schematically illustrates a method of using the simulated padlock device (30) of FIG. 3A/3B in conjunction with the training device (40) of FIG. 4A for simulated training of forcible entry of padlock devices, according to an embodiment of the invention. FIGS. 4C and 4D schematically illustrate a method of utilizing the training device (40) of FIG. 4A to form a simulated shackle element of a simulated padlock device (e.g., simulated shackle (33) of simulated padlock (30)) using a length of steel rod (33A), according to an embodiment of the invention.

Referring to FIGS. 4A and 4B, the training device (40) comprises a rectangular steel plate (41) comprising a plurality of mounting holes (42), a retaining bracket (43), a holding ring (44), a first rod retaining tube (45), a bending knob (46), a second rod retaining tube (47), and a set screw (48). As shown in FIG. 4B, the rod retaining tubes (45) and (47) are welded to the surface of the steel plate (41) using spot welds (49). The retaining bracket (43) and bending knob (46) are also welded to the surface of the steel plate (41).

In one embodiment, the retaining bracket (43) is configured to hingedly connect the holding ring (44) to the steel plate (41). As shown in FIG. 4B, the holding ring (44) is configured to hold a simulated padlock device (30) during a simulated training procedure, wherein an end portion of the u-shaped steel rod (33) is inserted through the holding ring (44) before connecting the u-shaped steel rod (33) to the simulated lock body (31/32), e.g., retained between the steel plates (31)/(32). When not in use, the holding ring (44) can be rotated to be positioned flat against the surface of the steel plate (41), as shown in FIG. 4A.

As further shown in FIG. 4B, when the simulated padlock device (30) is mounted to the training plate (40), the extended portions of the connecting bolts (35) and (36) maintain the lock body (31/32) of the simulated padlock device (30) at an offset distance D from the surface of the steel plate (41). This allows simulated cutting of a padlock shackle (i.e., cutting the u-shaped rod (33)) while keeping the circular rotating blade from gauging/cutting the surface of the steel plate (41). The training device (40) can be mounted to any suitable surface such as the outside surface of a vertical jamb of a commercially available forcible door entry training system, such as the forcible entry training door system disclosed in U.S. Pat. No. 8,408,917, which is commonly owned and incorporated herein by reference. In another embodiment of the invention, the training device (40) can be mounted to other types of objects such as a post or a wall, etc. The training device (40) can be mounted to any suitable surface or structure using mounting bolts that are inserted through the mounting holes (42) of the steel plate (41), or the training device (40) can be welded to a metallic surface.

It is to be understood that the rod retaining tube (45) and the bending knob (46) are optional components that can be included as part of the training device (40) to facilitate the creation of a simulated padlock shackle. For example, FIGS. 4C and 4D schematically illustrate a method of bending a length of steel rod (33A) to form the simulated shackle element (33) of the simulated padlock device (30) using the training device (40) of FIG. 4A, according to an embodiment of the invention. Referring to FIG. 4C, an individual can insert a length of steel rod (33A) through the rod retaining tube (45) past the bending knob (46). The steel rod (33A) can be a threaded or non-threaded piece of steel rod having a diameter of ¼ inch or ½ inch, for example. The individual can then proceed to apply a force F (as shown in FIG. 4C) by hand to bend the steel rod (33A) around the bending knob (46) back towards the rod retaining tube (45). FIG. 4D illustrates a result of the bending process wherein the steel rod (33A) is bent around the bending knob (46) to form the simulated shackle element (33). The bending knob (46) can have a diameter of about 1 inch to about 1.5 inches, for example, to create a u-shaped steel rod (simulated padlock shackle (33)) having an inner diameter (of the u-shaped end portion) equal to the diameter of the bending knob (46).

In addition, the second rod retaining tube (47) and the retaining screw (48) are optional components that can be included as part of the training device (40), which are utilized to enable the training of cutting of steel rods using a circular saw, reciprocating saw, or bolt cutters, for example For example, a length of steel rod (e.g., ¼-¾ inch diameter) can be inserted through the rod retaining tube (47) and held in place by tightening the set screw (48). Thereafter, an individual can proceed to cut off one or more pieces of the portion of the steel rod that extends past the side edges of the steel plate (41) using a circular saw, reciprocating saw, or bolt cutters, for example, to train the individual to utilize such cutting devices to cut through steel components.

Figure 5:
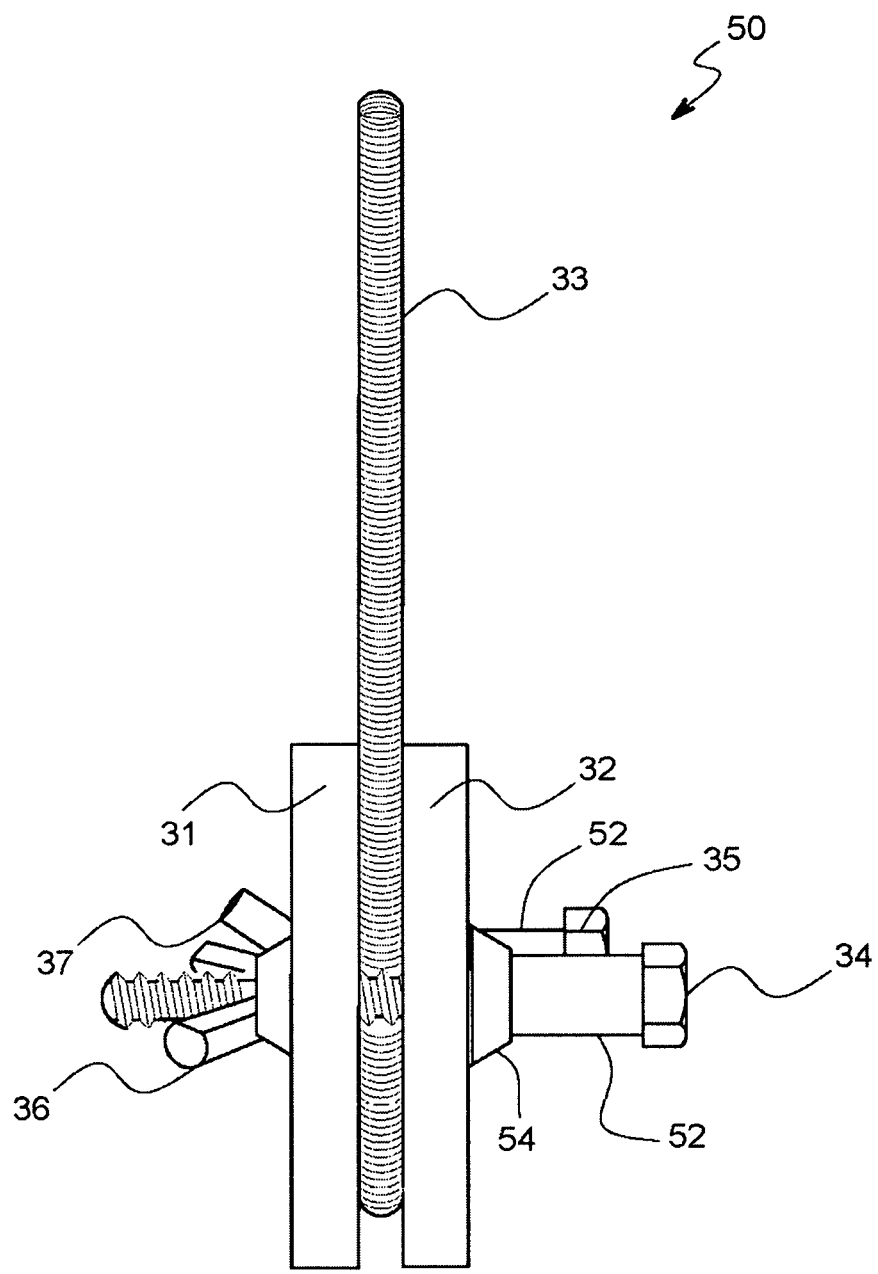
FIG. 5 is a perspective view of a simulated padlock device according to another embodiment of the invention.

FIG. 5 is a perspective view of a simulated padlock device (50) according to another embodiment of the invention, which is similar to the simulated padlock device (30) of FIGS. 3A/3B, except that the simulated padlock device 50 of FIG. 5 comprises a pair of tubular standoff elements (52) that are welded (54) to the face of the steel plate (32). In the embodiment of FIG. 5, each of the bolts (34) and (35) are inserted through one of the tubular standoff elements (52) and through aligned apertures formed in the steel plates (31/32). The wing nuts (36) and (37) are then tightened to secure the end portions of the simulated shackle element (33) between the steel plates (31/32) as discussed above. The embodiment of FIG. 5 allows an individual to readily replace the bolts (34) and (35) in the event that the threads of the bolts (34) and (35) become damaged over time from simulated training and use, which would prevent the wing nuts (36) and (37) (or other types of nuts) from being screwed onto the threaded shafts of the bolts (34) and (35) or otherwise prevent sufficient compressive tightening of the ends of the shackle element (33) between the steel plates (31/32).

Figure 6A:
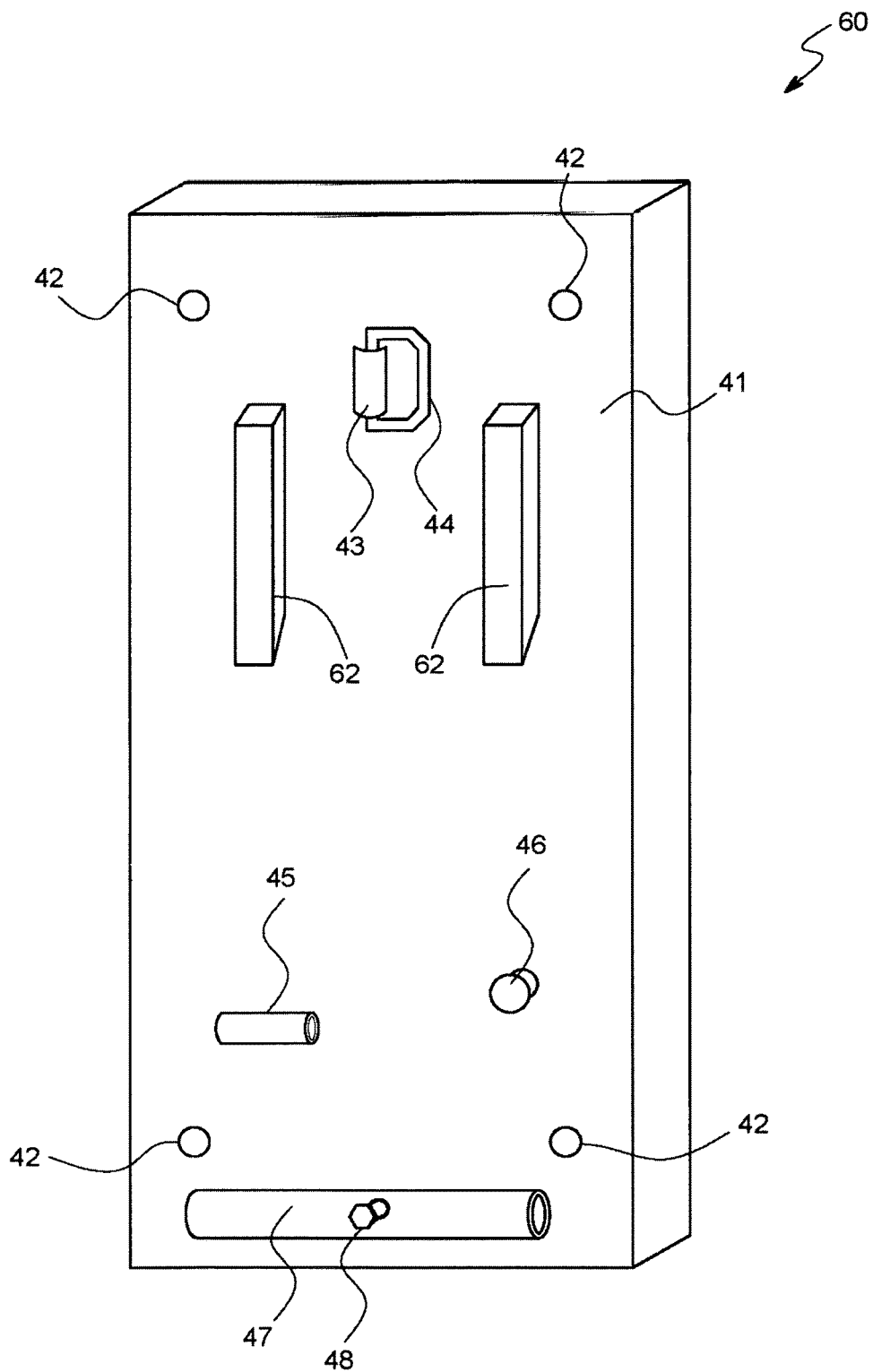
FIG. 6A schematically illustrates a training device that is configured for use in the training of forcible entry of padlocks, according to another embodiment of the invention.
Figure 6B:
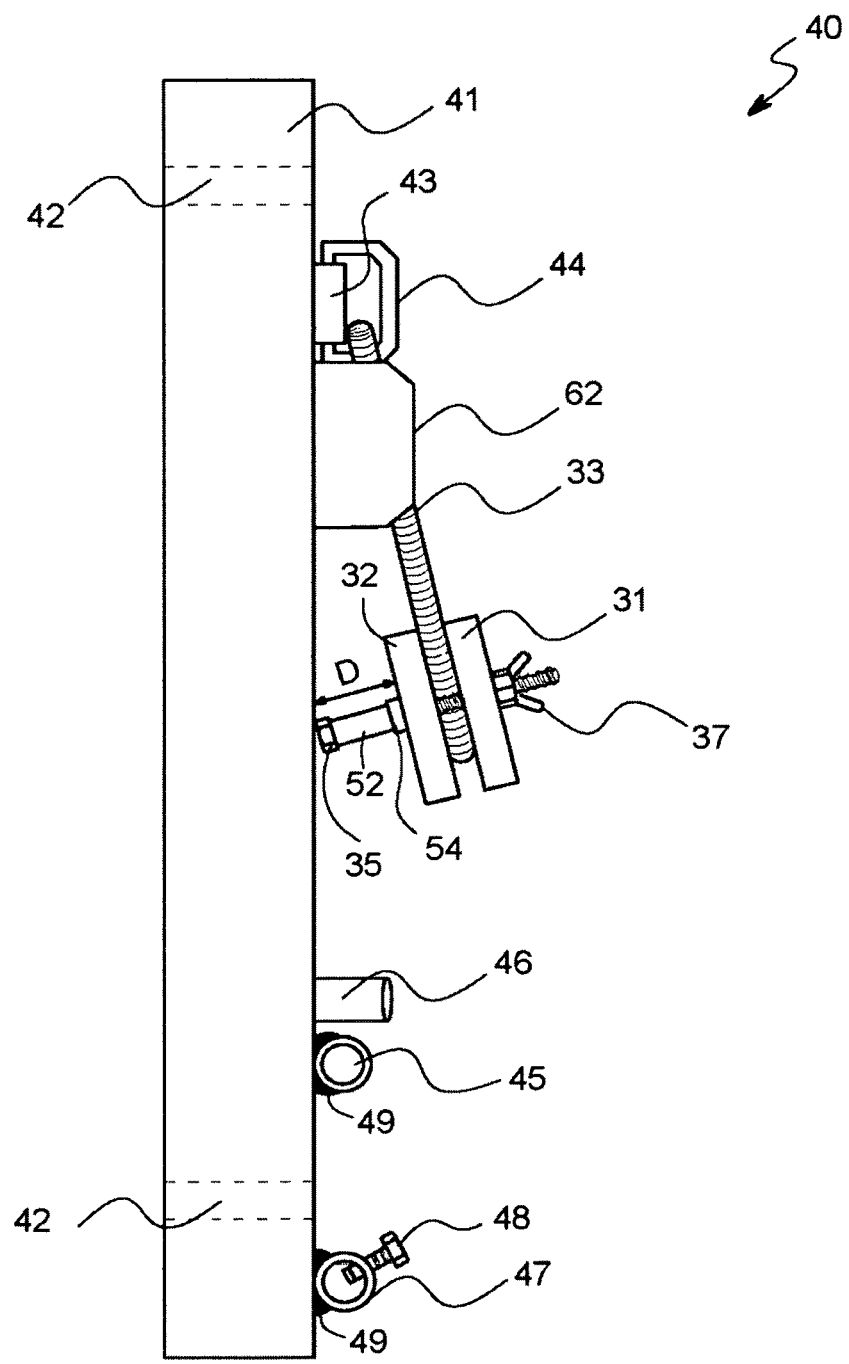
FIG. 6B schematically illustrates a method of using the simulated padlock device of FIG. 5 with the training device of FIG. 6A, according to an embodiment of the invention.

FIG. 6A schematically illustrates a training device (60) that is configured for use in the training of forcible entry of padlocks, according to another embodiment of the invention. The training device (60) of FIG. 6A is similar to the training device (40) of FIG. 4A, except that the training device (60) in FIG. 6A comprises a pair of retaining members (62) that are configured to maintain the simulated shackle element (33) in place during a simulated training procedure when the simulated shackle element (33) is being cut using a reciprocating or circular saw, for example. As shown in FIG. 6A, the retaining members (62) are disposed adjacent to each other on either side of the central axis of the retaining bracket (43) and holding ring (44). In one embodiment, the retaining members (62) comprises steel plates that are cut to a desired size and welded to the surface of the steel plate (41). FIG. 6B schematically illustrates a method of using the simulated padlock device of FIG. 5 with the training device of FIG. 6A, according to an embodiment of the invention. When in use, the u-shaped simulated shackle element (33) hangs from the retaining ring (44) and is disposed between the inner surfaces of the retaining members (62). The retaining members (62) prevent the simulated padlock device (30) from swinging side to side while cutting the simulated shackle element (33).

Figure 7:
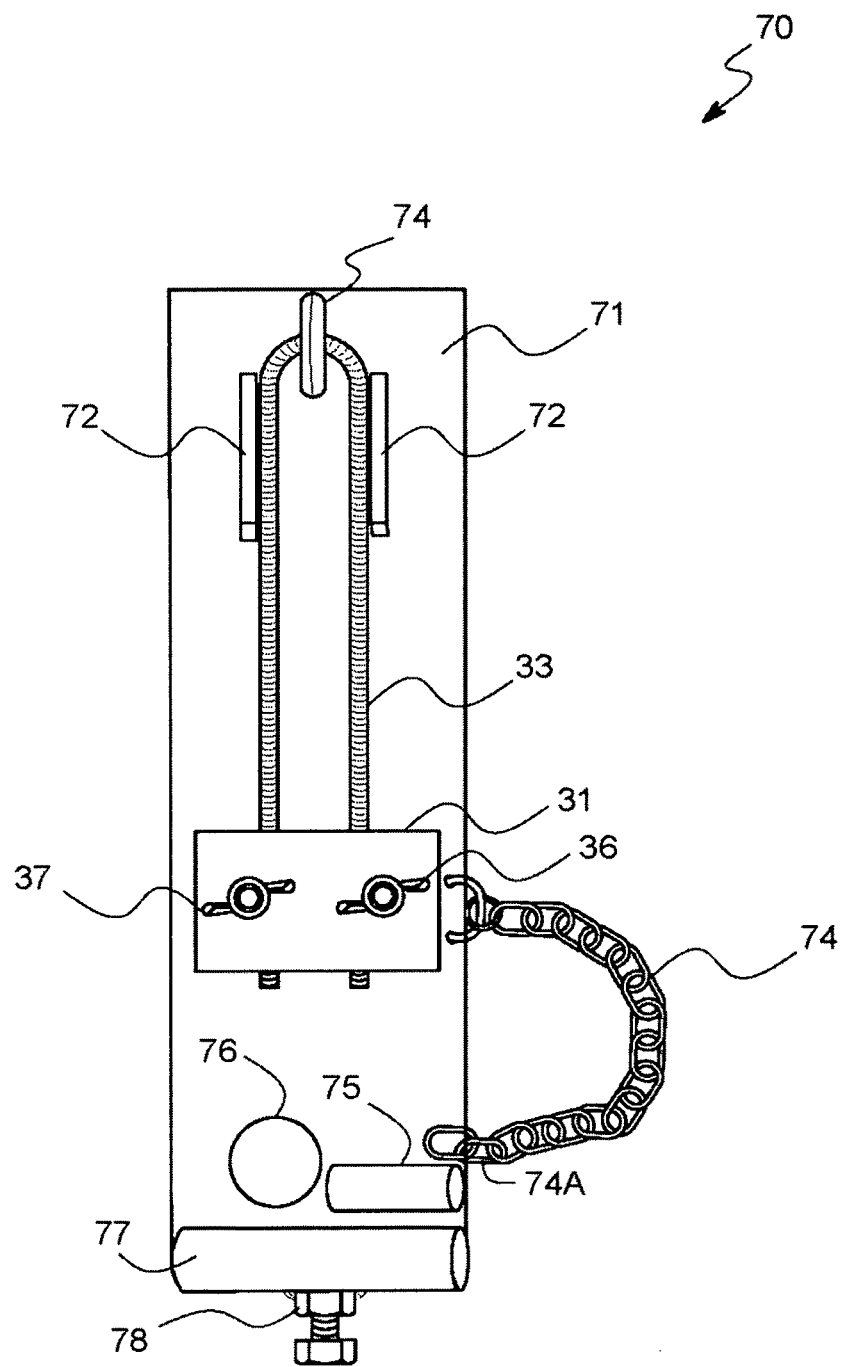
FIG. 7 schematically illustrates a training device that is configured for use in the training of forcible entry of padlocks, according to yet another embodiment of the invention.

FIG. 7 schematically illustrates a training device that is configured for use in the training of forcible entry of padlocks, according to yet another embodiment of the invention. In particular, FIG. 7 illustrates a training device (70), which is similar to the training device (60) of FIG. 6A, except that the training device (70) comprises a thinner profile (smaller width W) rectangular steel plate (71) and a holding ring (74) that is fixedly welded to a surface of the steel plate (71). Moreover, a rod retaining tube (75) and associated bending knob (76) (for bending steel rods to form simulated shackles) are disposed adjacent to each other. In addition, a rod retaining tube (77) with a set screw (78) (which is used for simulated cutting of steel rods, as discussed above) has a length that is about the same as the width W of the bottom edge of the steel plate (71). The thin profile training plate (70) can be readily mounted by, e.g., welding the steel plate (71) to the vertical jamb of a commercially available forcible door entry training system, such as the forcible entry training door system disclosed in U.S. Pat. No. 8,408,917, to enable simulated training in cutting and breaking of padlocks, in addition to simulated forcible entry of inward and/or outward swinging doors as provided by the forcible door entry training system.

FIG. 7 further shows a portion of the u-shaped simulated shackle element (33) disposed between a pair of retaining members (72) that are welded to, and protrude from, the surface of the steel plate (71). As discussed above, the retaining members (72) hold the simulated shackle (33) in position to prevent the simulated padlock device (30) from swinging left and right (in the drawing) during a simulated cutting training operation. In addition, in the embodiment of FIG. 7, an optional chain (74) is provided to connect the simulated padlock body (formed of steel plates 31/32) to the steel plate (71) of the training device (70). The chain (74) prevents the padlock body (31/32) from falling to the ground and potentially hitting the leg or foot of an individual during a simulated shackle cutting operation or a simulated lock-breaking operation when forcibly removing simulated lock body (31/32) from the end of the simulated shackle (33) using the tool (10) of FIG. 1A or the tool (11) of FIG. 1B, as discussed above.

As shown in FIG. 7, one ending link of the chain (74) can be spot welded to one of the steel plates (31) or (32) of the simulated padlock device (30), and another ending link of the chain (74) can be spot welded to the steel plate (71). The chain (74) comprises a removable link (74A) that enables the simulated lock body (31/32) to be disconnected from the steel plate (71) of the training device (71). In other embodiments of the invention, a steel cable or strong nylon line, for example, can be used in place of the chain (74).

Although illustrative embodiments have been described herein with reference to the accompanying drawings, it is to be understood that the invention is not limited to those precise embodiments, and that various other changes and modifications may be affected therein by one skilled in the art without departing from the scope or spirit of the invention.

I claim:

1. A simulated padlock device, comprising:
a first metallic plate;
a second metallic plate;
a u-shaped metallic rod; and
connecting elements to connect the first and second metallic plates together with end portions of the u-shaped metallic rod secured between the first and second plates by compressive forces applied from connecting the first and second metallic plates to each other using the connecting elements;
wherein the u-shaped metallic rod is configured to simulate a shackle of the simulated padlock device; and
wherein the first and second metallic plates connected together with the end portions of the u-shaped metallic rod secured therebetween are configured to simulate a lock body of the simulated padlock device with the simulated padlock device in a simulated locked state.

2. The device of claim 1, wherein the u-shaped metallic rod is a threaded steel rod.

3. The device of claim 1, wherein the u-shaped metallic rod is a non-threaded steel rod.

4. The device of claim 1, wherein the connecting elements are threaded bolts.

5. The device of claim 4, wherein the threaded bolts are welded to the first metallic plate.

6. The device of claim 1, wherein the connecting elements are threaded bolts, and wherein the device further comprises a first tubular standoff element and a second tubular standoff element, which are welded to the first metallic plate, and which are configured to insertable receive the threaded bolts.

7. The device of claim 1, wherein the first and second metallic plates comprise steel plates having thickness of about ¼ inch to about ¾ inch.

8. A device for simulated forcible entry of padlock devices, comprising:
a metallic base plate;
a holding ring connected to the metallic base plate; and
a simulated padlock device which is removably connected to the holding ring, the simulated padlock device comprising:
a first metallic plate;
a second metallic plate;
a u-shaped metallic rod inserted through the holding ring; and
threaded bolts connecting the first and second metallic plates together with end portions of the u-shaped metallic rod secured between the first and second plates by compressive forces applied from bolting the first and second metallic plates together using the threaded bolts;
wherein the u-shaped metallic rod is configured to simulate a shackle of the simulated padlock device; and
wherein the first and second metallic plates bolted together with the end portions of the u-shaped metallic rod secured therebetween are configured to simulate a lock body of the simulated padlock device with the simulated padlock device in a simulated locked state; and
wherein the threaded bolts extend past a face of the first metallic plate to maintain the lock body of the simulated padlock device offset from a face of the metallic base plate.

9. The device of claim 8, wherein the u-shaped metallic rod is a threaded steel rod.

10. The device of claim 8, wherein the u-shaped metallic rod is a non-threaded steel rod.

11. The device of claim 8, wherein the threaded bolts are welded to the first metallic plate.

12. The device of claim 8, further comprising a first tubular standoff element and a second tubular standoff element, which are welded to the first metallic plate, and which are configured to insertably receive the threaded bolts, and wherein the first and second tubular elements are configured to maintain the lock body of the simulated padlock device offset from a face of the metallic base plate.

13. The device of claim 8, wherein the first and second metallic plates comprise steel plates having thickness of about ¼ inch to about ¾ inch.

14. The device of claim 8, further comprising retaining members extending from a face of the metallic base plate, wherein the retaining members are configured to receive an end portion of the u-shaped metallic rod between the retaining members and prevent the simulated padlock device from moving back and forth during a simulated shackle cutting operation.

15. The device of claim 8, further comprising:
a rod retaining tube mounted to the metallic base plate; and
a bending knob mounted to the metallic base plate,
wherein the rod retaining tube is configured to insertably receive a straight metallic rod, and
wherein the bending knob is configured for bending a portion of the straight metallic rod, which extends from the rod retaining tube, around the bending knob to form said u-shaped metallic rod that serves as the simulated shackle for the simulated padlock device.

16. The device of claim 8, further comprising:
a rod retaining tube having a setscrew, which is mounted to the metallic base plate;
wherein the rod retaining tube is configured to insertably receive a straight metallic rod, and hold the straight metallic rod in place by engaging the setscrew.

17. The device of claim 8, wherein the holding ring is hingedly connected to the metallic base plate.

18. The device of claim 8, wherein the holding ring is fixedly connected to the metallic base plate.

19. The device of claim 8, further comprising a cable element to connect one of the first and second steel plates to the metallic base plate.

20. A forcible entry training door apparatus comprising:
a base plate;
a door frame mounted to the base plate, the door frame comprising a first side jamb, a second side jamb and a header jamb coupled between upper ends of the first and second side jambs;
a door having a first side edge and a second side edge;
at least one hinge attaching the first side edge of the door to the first side jamb of the door frame for hingedly mounting the door within the door frame; and
a device for simulated forcible entry of padlock devices, which is mounted to the door frame, wherein said device for simulated forcible entry of padlock devices comprises:
a metallic base plate;
a holding ring connected to the metallic base plate; and
a simulated padlock device which is removably connected to the holding ring, the simulated padlock device comprising:
a first metallic plate;
a second metallic plate;
a u-shaped metallic rod inserted through the holding ring; and
threaded bolts connecting the first and second metallic plates together with end portions of the u-shaped metallic rod secured between the first and second plates by compressive forces applied from bolting the first and second metallic plates together using the threaded bolts;
wherein the u-shaped metallic rod is configured to simulate a shackle of the simulated padlock device; and
wherein the first and second metallic plates bolted together with the end portions of the u-shaped metallic rod secured therebetween are configured to simulate a lock body of the simulated padlock device with the simulated padlock device in a simulated locked state; and
wherein the threaded bolts extend past a face of the first metallic plate to maintain the lock body of the simulated padlock device offset from a face of the metallic base plate.

* * * * *